INVENTORS:
TAMOTSU MURASE
ICHIRO MIKAMI
KYOHEI OIZUMI
MORIYOSHI TAMURA

BY Buckman and Archer
ATTORNEYS

United States Patent Office 3,590,078
Patented June 29, 1971

3,590,078
PROCESS FOR PRODUCTION OF ALKALI METAL SALTS OF TEREPHTHALIC ACID
Tamotsu Murase, Ichiro Mikami, Kyohei Oizumi, and Moriyoshi Tamura, Yamaguchi-ken, Japan, assignors to Ube Industries, Ltd., Yamaguchi-ken, Japan
Filed Sept. 29, 1966, Ser. No. 582,865
Claims priority, application Japan, Oct. 1, 1965, 40/59,759
Int. Cl. C07c 63/28
U.S. Cl. 260—515        4 Claims

ABSTRACT OF THE DISCLOSURE

Alkali metal salts of terephthalic acid are formed from salts of aromatic carboxylic acids by heating the raw materials in a reactor under controlled conditions of stirring and heat transfer so that the temperature distribution gradient from the heat transfer surface to the inner part of the reactor is initially high and is gradually lowered, whereby powdered or granular reaction products are recovered.

---

Figure 1:
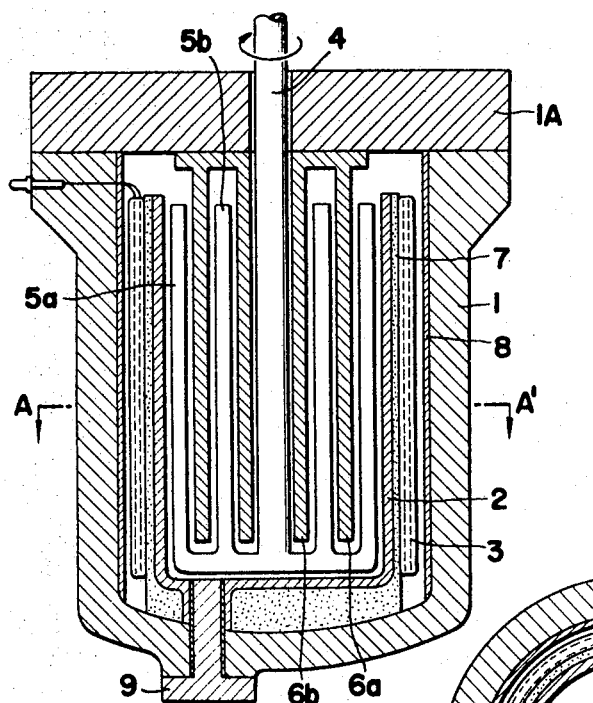

This invention relates to a process for the production of alkali metal salts of terephthalic acid, and more particularly to a process of producing powdery or granular alkali metal salts of terephthalic acid by thermal rearrangement of powdery alkali metal salts of aromatic carboxylic acids.

The "Henkel Method" has been heretofore known wherein alkali metal salts of terephthalic acid are produced by heating alkali salts of aromatic carboxylic acids, such as phthalic acid, isophthalic acid and benzoic acid, in the presence of or in the absence of catalyst and alkali compounds in an atmosphere of carbon monoxide or inert gas, such as carbon dioxide, at elevated temperature.

In such a thermal rearrangement reaction of the alkali salt of an aromatic carboxylic acid, the alkali metal salt first melts and then solidifies again with the formation of alkali metal salt of terephthalic acid as the reaction advances. In such a solidification process, the raw materials form a massive solid or stick to the walls of the reactor and to the blades of the stirrer, causing considerable difficulties in stirring. Thus, it becomes impossible to heat the raw materials uniformly. As a result, partially superheated raw materials decompose and carbonize, the yield and purity of prepared alkali metal salt of terephthalic acid fall, and it is very difficult to take out products.

In order to remove such troubles, various methods have been provided. Among them are, for example, a method in which solid raw materials are reacted by simultaneously heating and pressing them in film form with a heated sandwiching transfer apparatus, a method in which raw materials are reacted in a reaction chamber equipped with a rotary band, and a method in which powdery raw materials compressed into a reaction tube are heated. However, all of these methods are disadvantageous in industrial application because they require special intricate apparatus.

There is another method whereby powdery solid raw materials are pre-molded into the shape of a ball, tablet, rod or ring, and then the molded materials are thermally rearranged by heating in the reactor. However, this method requires an additional process expressly for the preparation of such pre-molded articles. Also, a special drying process is required to dry the molded articles because such molded articles are generally made of fine materials. Generally, the molded reaction products produced by reaction of the molded raw materials should be resolved in water to separate catalysts and other substances from such products. However, the resolution velocity of said products is extremely low, thus they must be crushed to accelerate the resolution process. In other words, this method suffers from the disadvantage that it requires such extra processes of molding powdery raw materials and crushing the molded products upon completion of the reaction.

For uniform heating of the powdery raw materials in the reactor, the materials charged into the reactor should be prevented from solidifying and kept in powdery state, and thus a reactor equipped with a special crushing apparatus capable of powerful and speedy stirring must be used. We have searched for a commercially feasible process for the production of alkali metal salt of terephthalic acid which is free from the above mentioned defects. As a result, we have invented a new process for the production of powdery or granular alkali metal salts of terephthalic acid from powdery alkali metal salts of aromatic carboxylic acid as raw materials as follows:

In the production of alkali metal salts of terephthalic acid by heating powdery alkali metal salts of aromatic carboxylic acids, if necessary, in the presence of alkali carbonates and catalysts in an atmosphere of one or more gases selected from the group consisting of carbon dioxide, carbon monoxide, nitrogen and lower hydrocarbon, a process for the production of alkali metal salt of terephthalic acid, which comprises heating uniformly a heat transfer surface of a reactor; controlling the stirring of raw materials and the heat transfer from said heat transfer surface to keep the temperature distribution of raw materials in the neighborhood of, but extending over a distance of more than 1 cm. from, said heat transfer surface in the state that said temperature distribution has a temperature gradient of 20 degrees centigrade or more per cm. measured in a direction normal to said heat transfer surface, the temperature gradient being highest in the region adjacent to said heat transfer surface and decreasing towards the center of the reactor at the time when the temperature of said heat transfer surface reaches the temperature to melt the raw materials in contact with said heat transfer surface; elevating the temperature of said heat transfer surface and decreasing said temperature gradient simultaneously for more than ten minutes after the temperature of said heat transfer surface reaches the temperature to melt the raw materials in contact with said heat transfer surface; completing the reaction by keeping the temperature of inner powdery materials uniformly at the desired reaction temperature level; and removing powdery or granular reaction products from the reactor.

According to this invention, reaction of alkali metal salt of benzoic acid and gaseous carbon monoxide to produce alkali metal salt of terephthalic acid is achieved advantageously because powder and gas contact sufficiently well in the reaction process.

In the process of this invention, the heat transfer surface of the reactor must be heated with substantial uniformity and the stirring state of raw material and the heat transfer quantity from said heat transfer surface should be controlled to keep the temperature distribution of raw material in the neighborhood of, but extending over a distance of more than 1 cm. from, said heat transfer surface at the temperature gradient of 20 degrees centigrade or more per cm. in a direction vertical to said heat transfer surface, the said temperature slope being highest at said heat transfer surface and decreasing towards the center of the reactor at the time when the temperature of said heat transfer surface reaches the temperature to melt the raw material in contact with said heat transfer surface.

If operated as above mentioned, at the time when the temperature of said heat transfer surface reaches the temperature to melt the raw material in contact with said heat transfer surface, the raw materials very close to said heat transfer surface are molten in the form of thin film, while the raw materials further inside from the place of the raw materials very close to said heat transfer surface still remains in powdery form because the temperature of said raw materials further inside are lower than the melting point due to the temperature gradient of 20 degrees centigrade or more per cm. Then, the raw materials molten in the form of thin film are transferred inward with the blades of the stirrer moving substantially in contact with said heat transfer surface, then the molten raw materials are solidified again and simultaneously granulated to fine balls with the powdery raw materials because the temperatures further inside the reactor are lower than the melting point of the raw materials. Here, a part of the raw materials has been reacted and rearranged to alkali metal salt of terephthalic acid.

If said temperature gradient were less than about 20 degrees centigrade per cm., the molten layer of the raw materials thickens and turns into a large mass as it is transferred inward in the reactor, thus causing considerable difficulties in the reaction operation.

Said temperature slope may be maintained at more than about 20 degrees centigrade per cm. in the early stage of reaction by controlling the revolution speed of the stirrer and the heat transfer quantity from said heat transfer surface. The too slow or too fast revolution speed of the stirrer is undesirable. The desirable revolution speed of the stirrer depends on the size of reactor, the heat transfer quantity, etc., and cannot be determined independently, thus it must be determined experimentally on each reaction apparatus. In case the apparatus explained in the example is used, 20–60 r.p.m. is the desirable revolution speed of the stirrer.

In this invention, one can use any shape of stirrer if it is designed to keep the temperature distillation of the raw material in the neighborhood of, but extending over a distance of more than 1 cm. from, said heat transfer surface at the temperature slop of 20° C. or more per 1 cm. in a direction vertical to said heat transfer surface, the said temperature gradient being highest at said heat transfer surface and decreasing towards the center of the reactor at the time when the temperature of said heat transfer surface reaches the temperature to melt the raw material in contact with said heat transfer surface. For example, the stirring apparatus as shown in FIG. 1 comprising the so-called "finger type" rotary blades and fixed blades is suitable.

When a part (10–50%) of alkali metal salts of aromatic carboxylic acid which is a raw material is changed to alkali metal salts of terephthalic acid with the advance of reaction, the reaction mixture of alkali metal salts of aromatic carboxylic acid and alkali metal salts of terephthalic acid is not molten under heat below 500° C. Thereafter, the reaction may be completed rapidly with a substantially uniform elevation of the temperature of the reaction mixture.

In this invention, at least ten minutes are required from the early stage of reaction in which the raw materials very close to the heat transfer surface are molten in the form of thin film to the stage in which the temperatures of the whole reaction mixtures become uniform by elevation of the temperatures of said heat transfer surface so as to raise the temperature of the reaction mixture to a desired reaction temperature level and by decrease of said temperature gradient.

The temperature of the heat transfer surface must be kept substantially uniform, preferably in the range of ±5° C. If the temperature of said heat transfer surface is not uniform, the local superheating of the reaction mixture takes place at the high temperature portion where the reaction mixture is unable to form a thin molten film, and the molten layer of raw material thickens, then the thick molten layer of raw materials solidifies to form a large mass with the progress of reaction. Therefore, the operation of reaction is disturbed and the foregoing object is not achieved. The reaction products containing alkali metal salts of terephthalic acid produced by the process of this invention are substantially spherical particles smaller than 1 mm. in diameter, and about 80% of said products pass through the 100 mesh Tyler's standard sieve. Also, said reaction products in powder or in particle have a good fluidity and the angle of repose of said products ranges from approximately 25° to 30°, therefore the required power of stirring is small and the operator can very easily take out said products from the reaction apparatus. Because the particles of said products are small as abovementioned, the resolution of said products in water is easy and special operations such as the crushing of products are not required in preparation of terephthalic acid from said products.

Figure 2:
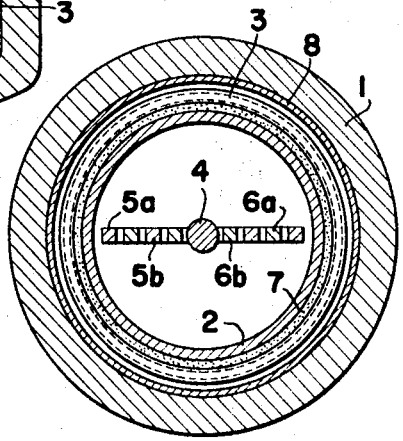

This invention is further described in reference to the accompanying drawings, in which:

FIG. 1 shows a side elevational view of an example of the apparatus embodying this invention; and FIG. 2 shows a cross-sectional view of the apparatus taken on line A-A' of FIG. 1.

Referring now to the accompanying drawings, the reaction apparatus for the production of alkali metal salts of terephthalic acid embodying this invention comprises an autoclave 1; a reactor 2 having an induction coil 3 on its outside and being set in said autoclave 1; a rotary stirrer set in the reactor 2 of which an axis of the stirrer 4 is secured with two outer rotary blades 5a and two inner rotary blades 5b, namely, one each on both sides of said axis of the stirrer 4 in a straight line; two outer fixed blades 6a secured, one on each of both sides of the center of the cover of the autoclave 1a, and set between the outer rotary blade 5a and the inner rotary blade 5b; two inner fixed blades 6d secured, one on each of the both sides of center of the cover of the autoclave 1a, and set between the inner rotary blade 5b and the axis of the stirrer 4; a heat insulating material 7 placed between the induction coil 3 and the reactor 2; a plate for preventing leakage of magnetic flux 8 mounted on the inside walls of the autoclave 1; and a plug for outlet of product 9, the protrusion top of which extends to the bottom of the reactor 2.

An alternating magnetic field is generated by flowing an alternating current in the induction coil 3, and an eddy current is generated by the action of an electromagnetic induction in the reactor 2 made of good electroconductor such as various metals or graphite, thus the reactor 2 itself evolutes heat with substantial uniformity. The difference of temperature between maximum and minimum values in the temperature distribution at the side walls of the reactor 2 is about 2° C. or less. As an alternating current source for this invention, any of low, middle and high frequency currents may be used. Because an exothermic body serves as a heat transfer body in the abovementioned apparatus, the reactor 2 may be heated in a short time to a desired temperature with a minimum energy. Also, because said alternating current is the only energy source introduced into the reactor 2, the operator can carry out most easily an accurate and rapidly responsive temperature control, without any fear of superheat, by detecting directly the temperature of the heat transfer surface of the reactor 2 and by controlling an input of the alternating current flowing into the induction coil 3. Therefore, according to the invention, the operator can carry out a temperature control far more accurately than with any other heating method. According to this invention, the temperature of the heat transfer surface of the reactor 2 is controlled easily within the range of ±5° C. of a desired temperature. An elevating speed of the temperature of the reactor 2 may be controlled at will by the voltage or amperage of the alternating current source.

It is preferable that a space between the outer rotary blade 5a and the inside walls of the reactor 2 should be as small as possible within a range allowed engineeringly and that the outer rotary blade 5a should move substantially in contact with the inside walls of the reactor 2. Furthermore, it is preferable that all of spaces between each of the outer and inner rotary blades 5a, 5b, the outer and inner fixed blades 6a, 6b and the axis of the stirrer should be as small as possible. The object of making spaces as small as possible as above mentioned is to separate a loosely held agglomeration of particles of reaction materials by the interaction of the rotary blades 5a, 5b and fixed blades 6a, 6b, but not to crush solidified reaction materials, therefore, there is no need of an extremely powerful stirring force. The cross sections of the rotary blades 5a, 5b and fixed blades 6a, 6b used in the apparatus embodying this invention may be in the shape of square, circle, ellipse, triangle or any other shape.

The heat insulating material 7 is intended to prevent the heat generated in the reactor 2 from escaping toward the induction coil 3 and the autoclave 1.

The plate for preventing leakage of magnetic flux 8 is a thin plate of silicon steel designed to prevent leakage of magnetic flux toward the autoclave 1.

The raw materials used in the process of this invention are alkali metal salts, especially potassium salts, of aromatic carboxylic acids (for example, benzoic acid, phthalic acid, isophthalic acid) or mixtures thereof, a mixture of compounds capable of producing these alkali salts, for example, the mixture of alkali metal carbonate and benzoic, phthalic or isophthalic acid. In addition to potassium salts, the salts of either lithium, sodium or cesium may be used.

As catalysts for this reaction, active carbon, metallic aluminum, silicon, chromium, titanium, copper, cadmium, zinc, iron, lead, manganese and cesium or the compounds of these metals such as oxides, halides, carbonates and salts of organic acids or mixtures thereof are effective. The abovementioned catalysts may be used in large amounts, but in most cases, the amount chosen ranging from 0.05% to 25% (weight) are employed.

In carrying out this reaction, it is preferable to add alkali metal carbonate as an additive.

As the alkali metal carbonate, potassium carbonate is most suitable, but lithium, sodium and cesium carbonate may also be used.

It is preferable that the reaction is carried out in the presence of a gas selected from the group consisting of carbon dioxide, carbon monoxide, nitrogen, hydrogen and lower hydrocarbon or the mixture thereof.

In the execution of this reaction, the presence of water should be especially avoided. In addition, it is desirable that oxygen is eliminated as much as possible.

This reaction begins at about 250° C. The optimum temperature varies with the type of catalyst and the reaction pressure, etc., and a temperature ranging from 350 to 480° C. is generally chosen. However, the temperatures higher than 500° C. should be avoided as the products tend to decompose and carbonise at these temperatures.

The following example is presented to illustrate the present invention.

EXAMPLE

The apparatus as shown in FIG. 1 and FIG. 2 was used in the reaction of this example. Here the reactor 2 was made of carbon steel and was 120 mm. in inside diameter and 200 mm. in depth. All the outer and inner rotary blades 5a, 5b and the outer and inner fixed blades 6a, 6b had the sectional shape of rectangle of 14 mm. x 12 mm. The number of revolutions of a rotary stirrer was 40 r.p.m. The induction coil made by winding a copper belt of 6 mm. x 2 mm. was cylinder-shaped and 180 mm. in inside diameter, 225 mm. in outside diameter an 200 mm. in height.

The reactor 2 was heated by flowing the alternating current of 300 cycles and 240 volts into said induction coil, then the temperature of the heat transfer surface of the reactor 2 was controlled by an on-and-off way of said alternating current.

A powdery mixture consisting of 620 g. of powdery potassium benzoate passed through the 200-mesh Tyler's standard sieve, 310 g. of potassium carbonate, 40 g. of zinc oxide and 30 g. of powdery active carbon was placed in said reactor, and the oxygen present therein was removed. Then a gaseous mixture of carbon monoxide and carbon dioxide in volume ratio of 1:1 was introduced up to a guage pressure of 100 atmospheres at a room temperature, and said powdery mixture was stirred.

Said reactor was heated by flowing said alternating current in said induction coil. When the temperature of the heat transfer surface of said reactor reached 400° C., the temperature of powder at a distance of 2 cm. from said heat transfer surface was 240° C. After 10 minutes, the temperature of said heat transfer surface became 455° C. and that of said powder, 400° C. Further 10 minutes after that, the temperature of said heat transfer surface became 460° C., and that of said powder, 430° C. Thereafter, the powder in said reactor was kept with substantial uniformity at a temperature of 435° C. by controlling the temperature of said heat transfer surface in the range of 460±5° C.

After the reaction was continued for two hours from the time when the temperature of the powder in said reactor reached 400° C., the reaction products were taken out from said reactor.

Figure 3:
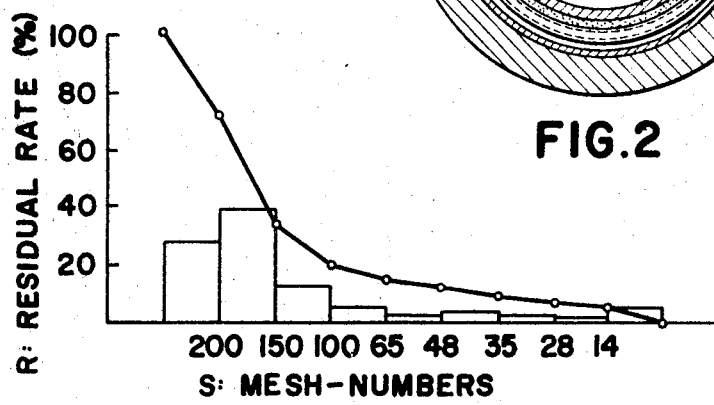

Most of the reaction products are spherical particles smaller than 1 mm. in diameter, and about 80% of said reaction products passed through the 100-mesh Tyler's standard sieve. A size distribution of said reaction products is shown in FIG. 3. In FIG. 3 residual rate R means the proportion of the reaction products that remain on the Tyler's standard sieve of mesh-number S to the whole of the reaction products, and is shown in percentage. A solid line was prepared by plotting residual rates on the Tyler's standard sieve of each mesh-number. A columnar graph shows in percentage the proportion R of the reaction products that pass through a sieve of a less mesh-number but not through a sieve of a greater mesh-number to the whole of the reaction products.

The angle of repose of the reaction products is 28° and the fluidity of said products is very good.

430 g. of terephthalic acid was obtained from said products by solution into water and filtration and then by acidifying precipitation of said products via a general method.

What we claim is:

1. In the production of an alkali metal salt of terephthalic acid by heating in a reactor raw materials comprising a powdery alkali metal salt of an aromatic carboxylic acid, a process for the production of powdery or granular alkali metal salt of terephthalic acid, of particle size predominantly smaller than 1 mm. in diameter, 80% of which goes through a 100 mesh Tyler's sieve which comprises uniformly heating a heat transfer surface of the reactor, controlling the stirring of said raw materials and the heat transfer from said heat transfer surface to keep the temperature distribution of said raw materials in the neighborhood of, but extending over a distance of more than 1 cm. from, said heat transfer surface such that said temperature distribution has a temperature of at least 20 degrees centigrade or more per cm. in a direction measured normally to said heat transfer surface, said temperature gradient being highest at said heat transfer surface, and decreasing towards the center of the reactor at the time when the temperature of said heat transfer surface reaches the temperature to melt the raw materials in contact with said heat transfer surface; simultaneously elevating the temperature of said heat transfer surface and decreasing said temperature gradient for more than ten minutes from the time when the temperature of said heat transfer surface reaches the temperature to melt the raw materials in contact with said heat transfer surface; completing a given reaction by keeping the temperature of powdery material in the reactor uniform at the desired reaction temperature level; and removing reaction products from the reactor.

2. A process according to claim 1 wherein the production is carried out in the presence of alkali metal carbonates and catalysts in the atmosphere of a gas selected from the group consisting of carbon dioxide, carbon monoxide, nitrogen and lower hydrocarbon and the mixture thereof.

3. The process according to claim 1, wherein the aromatic carboxylic acid is a compound selected from the group consisting of phthalic acid, isophthalic acid and benzoic acid.

4. The process according to claim 1, wherein the alkali metal is a metal selected from the group consisting of potassium, lithium, sodium and cesium.

References Cited
FOREIGN PATENTS

| | | | |
|---|---|---|---|
| 777,497 | 6/1957 | Great Britain | 260—515 |
| 833,019 | 4/1960 | Great Britain | 260—515 |
| 1,168,886 | 4/1964 | Germany | 260—515 |

CHARLES B. PARKER, Primary Examiner

E. J. SKELLY, Assistant Examiner

U.S. Cl. X.R.

23—290